US006536714B2

United States Patent
Gleine et al.

(10) Patent No.: US 6,536,714 B2
(45) Date of Patent: Mar. 25, 2003

(54) PRESSURE CONTROL SYSTEM FOR A PRESSURE-EXPANDABLE DISPLACEMENT ELEMENT

(75) Inventors: Wolfgang Gleine, Kakensdorf; Knut Mau; Udo Carl, both of Hamburg, all of (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 09/837,637

(22) Filed: Apr. 17, 2001

(65) Prior Publication Data

US 2002/0074459 A1 Jun. 20, 2002

(30) Foreign Application Priority Data

Apr. 17, 2000 (DE) .......................................... 100 19 187

(51) Int. Cl.[7] .................................................. B64C 3/44
(52) U.S. Cl. ...................................... 244/214; 244/219
(58) Field of Search .............................. 244/213–215, 244/219, 210, 211

(56) References Cited

U.S. PATENT DOCUMENTS

| | | | | |
|---|---|---|---|---|
| 2,306,759 A | * | 12/1942 | Sears | 244/219 |
| 3,128,966 A | * | 4/1964 | Alvarez-calderon | 244/214 |
| 3,270,699 A | * | 9/1966 | Bush | 244/219 |
| 4,235,400 A | * | 11/1980 | Haworth | 244/219 |
| 6,015,115 A | * | 1/2000 | Dorset et al. | 244/219 |
| 6,135,395 A | * | 10/2000 | Collett | 244/214 |

OTHER PUBLICATIONS

Article entitled: "Airframe Noise Studies on Wings with Deployed High–Lift Devices", by Werner Dobrzynski et al.; 1998; Deutsches Zentrum für Luft—und Raumfahrt e.V. (DLR) Institute für Entwurfsaerodynamik Abteilung Technishe Akustik, Forschungszentrum Braunschweig, Germany; American Institute of Aeronautics and Astronautics, pp. 1 to 17.

* cited by examiner

*Primary Examiner*—Galen L. Barefoot
(74) *Attorney, Agent, or Firm*—W. F. Fasse; W. G. Fasse

(57) ABSTRACT

An elastically expandable hollow displacement element is secured to the rear surface of an aircraft wing slat. When the displacement element is contracted, the slat may be retracted onto the wing's leading edge. When the slat is extended, the displacement element is expanded to protrude convexly from the slat, thereby preventing vortex formation in the slat air gap and reducing aero-acoustic noise. A pressure control system for inflating and deflating the displacement element includes a bleed air line connected from the aircraft engine bleed air system to the displacement element, a shut-off valve and a pressure control valve interposed in series in the bleed air line, and a slat contour controller connected by respective signal lines to the valves, which control the quantity and the pressure of the bleed air supplied into the displacement element, for properly inflating the same.

19 Claims, 4 Drawing Sheets

PRESSURE CONTROL SYSTEM FOR A PRESSURE-EXPANDABLE DISPLACEMENT ELEMENT

PRIORITY CLAIM

This application is based on and claims the priority under 35 U.S.C. §119 of German Patent Application 100 19 187.8, filed on Apr. 17, 2000, the entire disclosure of which is incorporated herein by reference.

CROSS-REFERENCE TO RELATED APPLICATION

This application is related to our copending application entitled AERODYNAMIC NOISE REDUCING STRUCTURE FOR AIRCRAFT WING SLATS, being filed simultaneously on the same date as this application. The entire disclosure thereof is incorporated herein by reference.

FIELD OF THE INVENTION

The invention relates to a system for controlling the pressure of compressed air supplied to a hollow expandable displacement element, and especially such a displacement element forming a component of an arrangement for reducing aero-acoustic noise generated by the slats on the wings of a commercial transport aircraft.

BACKGROUND INFORMATION

Various noise sources contribute to the total noise generated during the flight of a modern commercial transport aircraft. Among the various noise sources, aero-acoustically generated noise that results from the flow pattern of air around the aircraft structure is becoming an evermore significant portion of the total flight noise. This is because the noise generated by other sources such as the engines has been reduced in recent years by technical advances of those components. In present day commercial transport aircraft, it is roughly estimated that approximately 50% of the total flight noise during a landing approach is generated by the flow of air around the aircraft At structure, while the other half of the total noise is generated by the engines.

Further improvements, i.e. reductions, in the noise generated by the engines are only practically and economically efficacious if similar technical advances for reducing the aerodynamic flow noise around the aircraft fuselage can be simultaneously achieved. It is becoming especially important to reduce the aerodynamic flow noise in view of ever stricter noise level limits, especially around airports with a high aircraft traffic volume. A major factor contributing to the total aerodynamic flow noise during landing and take-off of a modern commercial transport aircraft, is the noise generated by the airflow around high-lift slats deployed from the leading edges of the wings during the landing and take-off phases.

To facilitate an understanding of the aerodynamic noise generated in connection with the leading edge slats, FIG. 5 of the present 5 application shows representative streamlines of the air A flowing around a generally conventional wing, which is schematically shown in section. The wing arrangement includes a main wing 2, a leading edge slat 1 that is extended or deployed (either pivotally or slidingly) forward of the leading edge of the main wing 2, and a landing flap 11 that is extended or deployed rearward from the trailing edge of the main wing 2. Throughout this specification, the term "forward" and the like refers to the normal forward flight direction of the aircraft, for example the direction in which the aircraft nose and the wing leading edges are oriented. As is generally known, the extended slat 1 and landing flap 11 change the effective camber and angle of attack of the airfoil profile of the wing structure, and also influence the airflow over the surfaces of the wing, so as to increase the lift, e.g. for landing and take-off. In this extended configuration, the slat 1 is deployed forwardly and downwardly from the leading edge nose 2A of the main wing 2 so as to form a slat air gap 130 between a rearwardly facing concave curved surface 3 of the slat 1 and the convexly profiled leading edge nose 2A of the main wing 2.

On the other hand, during cruise flight, the slat 1 is retracted into a retracted position (not shown) directly on the leading edge nose 2A of the main wing 2 so as to reduce the aerodynamic drag and avoid unnecessary increased lift. In this context, the leading edge slat 1 must be retracted smoothly and flushly against the leading edge nose 2A of the main wing 2, so as to form a substantially continuous aerodynamic contour. Namely, the slat 1 is adjacent to the leading edge nose 2A, with at most only a small, aerodynamically insignificant, gap or space therebetween. Therefore, the rear concavely curved surface 3 of the leading edge slat 1 has a profile curvature substantially matching the convex curvature of the leading edge nose 2A of the main wing 2, so that the slat 1 smoothly matches or mates onto the leading edge nose 2A of the main wing 2 without a resistance-causing gap or discontinuity therebetween.

Unfortunately, the profile curvature of the rear concave surface 3 of the slat 1 may be optimal for mating onto the leading edge is nose 2A of the main wing 2 in the retracted position, but it is not optimal for the airflow through the slat air gap 130 between the leading edge nose 2A and the slat 1 in its deployed position as shown in FIG. 4. As a result, the airflow A forms an eddy or vortex 150 that extends lengthwise along the length of the slat 1 (i.e. in the wing span direction). This vortex 150 involves the turbulent eddy recirculation of air in the hollow space defined and bounded by the rear concave curvature 3 of the slat 1, whereby this space generally has a tapered concave shape or tear-drop shape. This vortex 150 further exhibits or generates a fluctuating fluid pressure field of the affected airflow, which is believed to be the cause of the aerodynamic noise generated in this area. Noise measurements in an aero-acoustic wind tunnel have confirmed that a significant reduction of the noise generated by the extended slat can be achieved by arranging a rigid fairing or filler member in the space along the rear concave curvature 3 of the slat 1, which would otherwise be occupied by the vortex 150.

Attempts have been made in the prior art to reduce the aerodynamically generated noise, especially in connection with the slats and the mounting thereof. For example, a study in this regard was published by Werner Dobrzynski and Burkhard Gehlhar entitled "Airframe Noise Studies on Wings with Deployed High-Lift Devices", from the Deutsches Zentrum fuer Luft und Raumfahrt e.V. (DLR), Institut fuer Entwurfsaerodynamik, Abteilung Technische Akustic, Forschungszentrum Braunschweig, Germany, at the Fourth American Institute of Aeronautics and Astronautics AIAA/CEAS Aeroacoustics Conference on June 2 to 4, 1998 in Toulouse, France.

Among other things, this study disclosed a proposed noise reducing arrangement in which a sheet metal guide member is pivotally connected to the slat in the area of the concavely curved rear or inner surface of the slat facing toward the leading edge nose of the main wing. This sheet metal air guide can be pivoted relative to the slat. Particularly, the air guide member can be extended or deployed relative to the slat during take-off and landing when the slat is deployed relative to the wing. On the other hand, the sheet metal air guide member will be pivoted against the slat during cruise flight when the slat is to be retracted relative to the wing. While such a proposed solution may have achieved a reduction of aerodynamically generated noise in wind tunnel tests, it is considered that such a solution could never be practically carried out in an actual aircraft construction, for practical reasons.

For example, in the previously proposed arrangement, when the slat is retracted against the leading edge nose of the main wing for cruise flight, the gap between these two components is not sufficiently large for accommodating a rigid air guide member tilted or pivoted inwardly against the rear surface of the slat. On the other hand, if the gap is made larger to accommodate the at air guide member, then a disadvantageous aerodynamic gap or discontinuity would be formed along the aerodynamic contour provided by the slat and the wing in combination. Moreover, if a flexible air guide component is provided, which is to be adapted against the inner contour of the slat in the retracted position, then such a component would not have sufficient strength and stiffness in order to withstand the aerodynamic forces in the deployed condition.

Moreover, such a guide element would be expected to have a tendency to flutter due to the alternating aerodynamic pressure effect, or simply due to a failure to remain sufficiently rigid to withstand the aerodynamic forces. Namely, the proposed sheet metal separating surface or air guide member will be subjected to considerable fluctuating aerodynamic forces, which will presumably excite vibrations or oscillations in the member, since it is only to be pivotally connected to the lower edge of the slat without any further stiffening means. Such fluttering generates a significant noise radiation, which is directly contrary to the object of reducing the noise. Furthermore, a pivotally connected sheet metal member requires additional mechanical movable parts, which leads to an increased total weight of the aircraft, as well as increased manufacturing and maintenance costs. It would also be necessary to construct the pivot joint in such a manner that the transition from the underside of the slat to the joint of the separating surface is free of contour discontinuities or gaps, which makes it necessary to achieve a very high manufacturing accuracy.

Additional problems arise because the contour of the rear surface of the slat as well as the geometry of the slat air gap change over the span width of the wing, so that the air guide element or elements must be configured with a bend or twist along the length thereof, whereby the tilting and retracting mechanism becomes further complicated.

A failure situation, for example involving a blockage of the mechanical system of the slat arrangement, would become very critical, because then the slat could no longer be retracted if the air guide member is blocked or jammed in its deployed or extended position.

The above mentioned conference proceedings provide no suggestions toward overcoming the just mentioned significant problems and disadvantages in actually trying to carry out the proposed solution using a pivotable air guide member in practice. Especially, the prior art provides no suggestions toward a special pressure control system to be used in connection with an inflatable expandable arrangement for reducing the aero-acoustic noise generated by the slats of an aircraft wing. Particularly, the prior art does not provide any suggestions toward a system for controlling the pressure and volume of compressed air for the controlled inflation of an expandable displacement element secured on the concave rear surface of a slat in order to improve the aerodynamic contour and prevent or reduce the formation of a vortex along a slat, and thereby reduce the generation of aero-acoustic noise.

SUMMARY OF THE INVENTION

In view of the above, it is an object of the invention to provide a pressure control system for an inflatable, elastically expandable displacement element that is secured on the concave rear surface of a wing slat in order to controlledly and selectively inflate the displacement element with a controlled or regulated inflation pressure, to achieve a respective required inflation condition and shape of the displacement element. The pressure control system shall operate independently of the pressure of the bleed air system of the aircraft, and shall require a minimum of operating power or particularly a minimum of bleed air. Moreover, the system shall be simple to install, and shall even be retrofittable into existing aircraft, while also requiring only a simple maintenance. The invention further aims to overcome or avoid the disadvantages of the prior art, and to achieve additional advantages, as apparent from the present specification.

The above objects have been achieved according to the invention in a pressure control system for regulating or controlling the supply of compressed air to an elastically expandable hollow displacement element of an arrangement for reducing the aero-acoustically generated noise of a wing slat of an aircraft. Particularly according to the invention, the pressure control system includes a shut-off valve with a respective valve controller, a pressure regulating (or control) valve with a respective valve controller, and a wing slat contour controller or regulating device that is connected by respective data signal lines to a the respective valve-controllers of the shut-off valve and the pressure regulating valve. The shut-off valve and the pressure control valve are interposed in series in a bleed air line that is connected from a bleed air system of the aircraft to an inflatable hollow space within the elastically expandable displacement element which is secured on the concave rear surface of the wing slat. The shut-off valve controls the supply of compressed engine bleed air through the bleed air line to the displacement element, based on a defined air quantity or volume that is to be supplied into the displacement element for inflating the same. The pressure regulating (or control) valve monitors and regulates the air pressure of the compressed engine bleed air being supplied into the displacement element.

With the inventive pressure control system, the displacement element can be safely and precisely inflated to the required inflated shape to achieve a respectively required configuration or overall profile contour of the slat including the displacement element, for a particular flight condition. The displacement element can be properly inflated regardless of the possibly varying system pressure of the aircraft bleed air system. Also, the displacement element is protected against over-pressure conditions which could otherwise cause a bursting rupture of the displacement element. The inventive pressure control system also provides for the proper controlled deflation of the displacement element, when the displacement element is to be contracted into a contracted configuration for retracting the slat against or onto the leading edge nose of the main wing. Also, the inventive system is able to monitor or test the airtight condition of the inflatable displacement element, by pressurizing the element, closing the shut-off valve, and then monitoring the pressure of the air confined in the element.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 5:
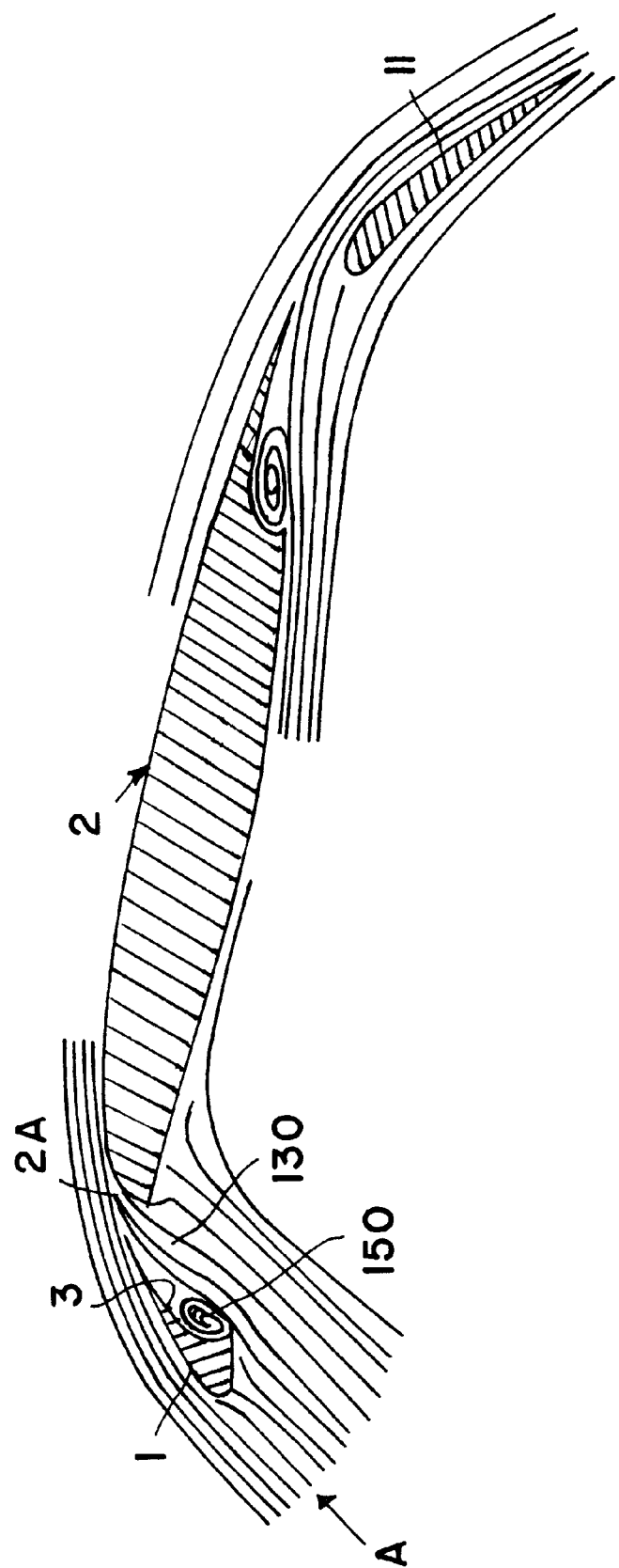
FIG. 5 is a schematic sectional view of a generally conventional wing with a high lift slat and a landing flap extended from a main wing in a landing configuration, to illustrate the formation of a slat vortex.

The general structure of a main wing 2 with an extended high-lift slat 1 and an extended landing flap 11, as well as the aerodynamic flow streamlines A associated therewith, in a conventional arrangement, have been discussed above in connection with FIG. 5. The general object of the invention is to avoid or reduce the formation of the vortex 150 along the slat 1 while improving the aerodynamic configuration of the slat air gap 130 when the slat 1 is in the extended position, while still allowing a proper full retraction of the slat 1 against the leading edge nose 2A of the main wing 2. The inventive arrangement shall not have disadvantageous influences on the aerodynamic characteristics, such as the lift and the aerodynamic resistance, but rather actually improves these aerodynamic characteristics. More particularly, the main point of the invention is to provide a controlled inflation of an inflatable displacement element, so that it has a proper operation and shape so as to achieve the above mentioned effects.

Figure 1:
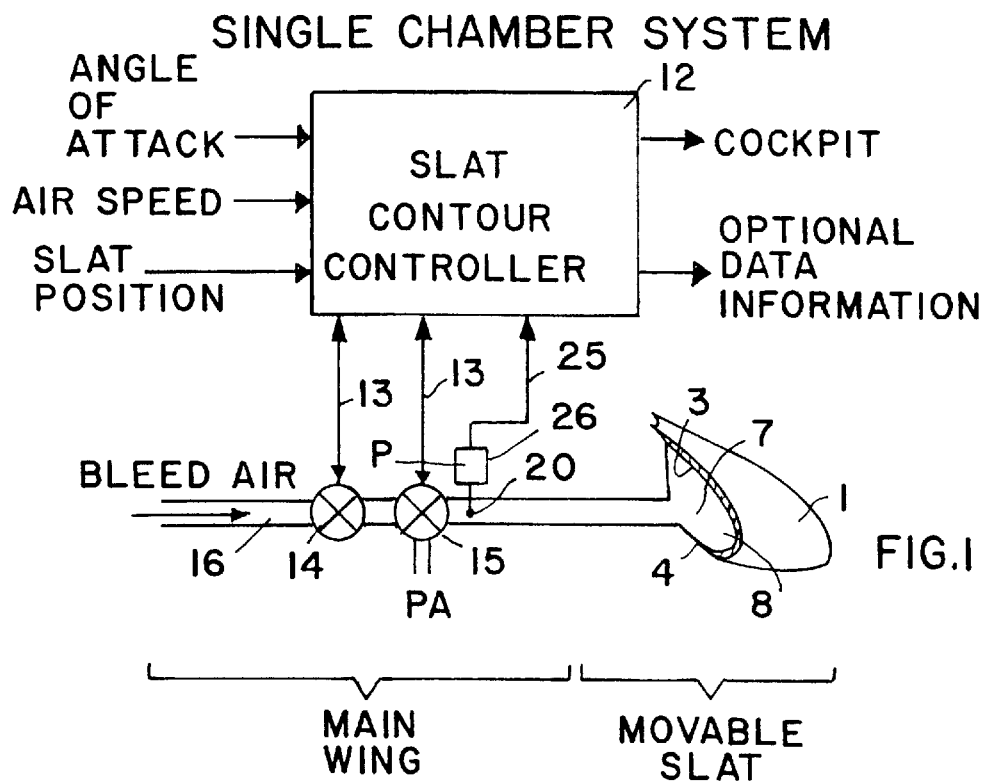
FIG. 1 is a schematic diagram of a pressure control system in a single chamber system, i.e. in connection with a single-chambered displacement element.
Figure 2:
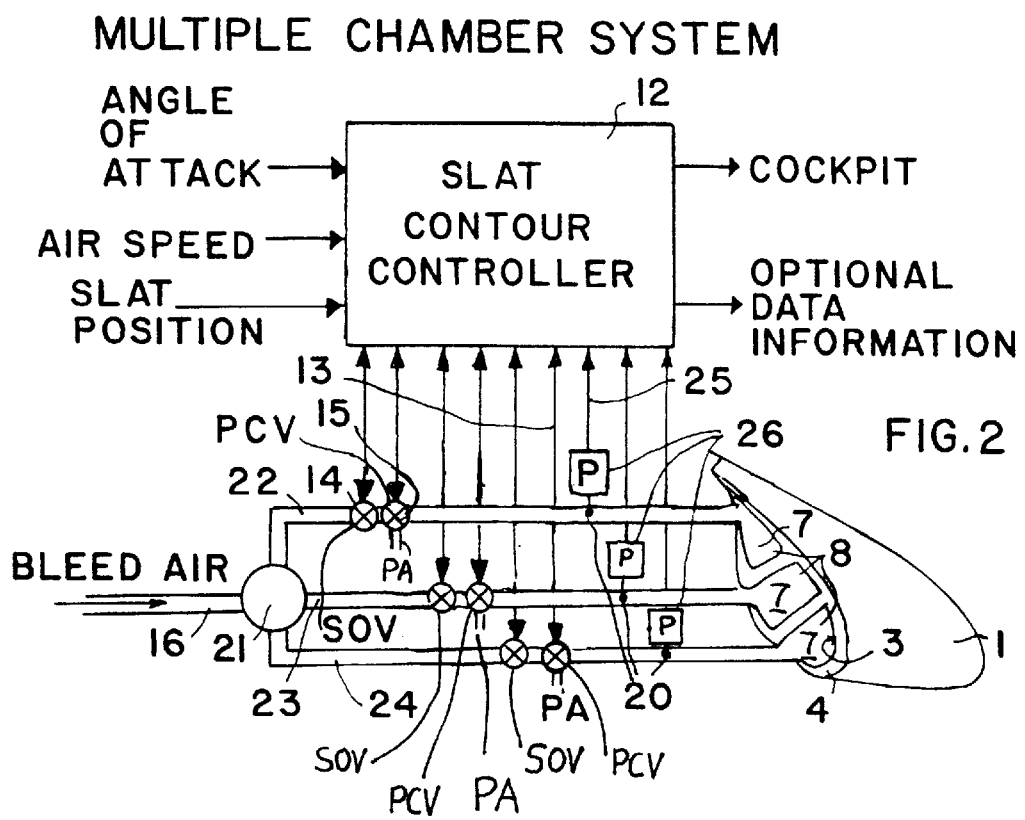
FIG. 2 is a schematic diagram similar to that of FIG. 1, but for a multiple chamber system, i.e. in connection with a multi-chambered displacement element.
Figure 4:
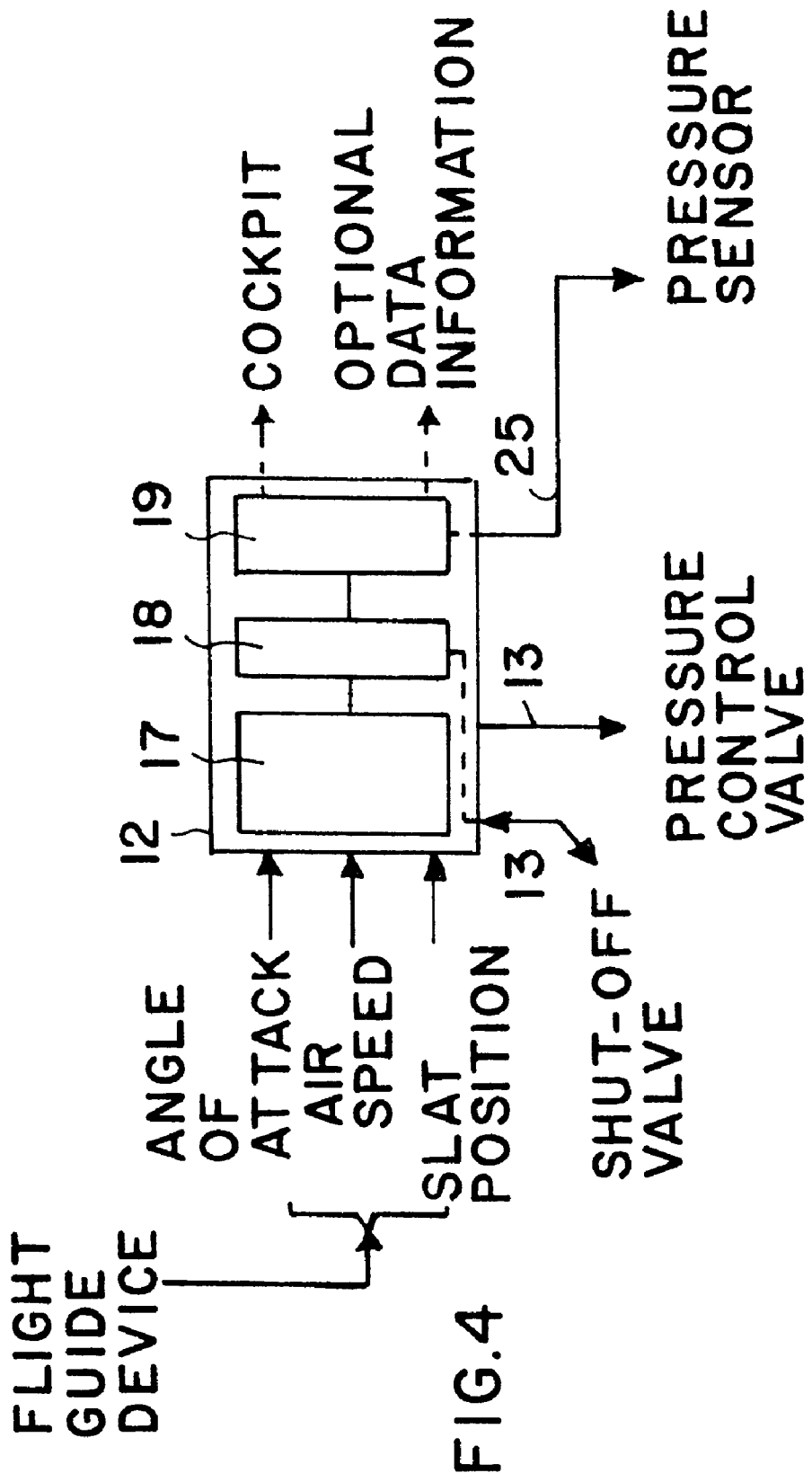
FIG. 4 is a schematic block diagram of the general structure of a slat contour controller, with identification of the various input and output connections thereof.

To this end, the present inventive pressure control system operates in connection with at least one inflatable, expandable displacement element 4 that is secured onto the concave rear surface 3 of a slat 1, for example by adhesive bonding. The element 4 can be inflated into an inflated condition to reduce or avoid the formation of the above mentioned slat vortex 150 when the slat is in the extended configuration. For purposes of the present application, one can consider the displacement element 4 to generally comprise a hollow inflatable bag, boot or bellows of an elastically stretchable material, optionally further in combination with a shape-retaining material, for example which constrains and defines the final maximum inflated shape of the displacement element 4. The inventive pressure control 20 system serves to control the provision of compressed air that is generated or provided from within the aircraft (e.g. by the compressor stage of one or more engines of the aircraft, feeding compressed engine bleed air into the aircraft bleed air system), to the displacement element 4 in a volume-controlled and pressure-controlled manner so as to achieve the proper and safe inflation of the displacement element 4, and also to achieve the proper resulting inflated or expanded shape of the displacement element 4. FIG. 1 schematically represents the construction of such a pressure control system of a displacement element 4 with a single chamber system, i.e. a displacement element 4 having a single hollow chamber 8 confined within the hollow space 7 within the element 4. On the other hand, FIG. 2 schematically represents the construction of a pressure control system for a displacement element 4 of a multiple chamber system, i.e. a displacement element 4 having plural (e.g. three) chambers 8 defined within the hollow space 7 in the displacement element 4. FIG. 4 illustrates further details regarding the construction and the input and output connections of the slat contour controller 12.

Referring now to FIG. 1, the displacement element 4 has an interior hollow space 7 defining a single hollow chamber 8 therein. The pressure control system for this displacement element 4 comprises a slat contour controller or regulating unit 12, which is connected via data signal lines 13 respectively to the electronic valve controller of a shut-off valve 14 and the electronic valve controller of a pressure regulating valve or pressure control valve 15. For simplicity, the term "valve" can also be used to refer to the combination of the valve proper with the valve controller. The data lines 13 may be electrical conductors that are adapted to conduct electrical signals thereon. Alternatively, the data lines 13 could be optical fibers for conducting optical signals thereon.

The shut-off valve 14 and the pressure control valve 15 may generally be connected to any compressed air header or plenum line which is available to supply the required compressed air for inflating the displacement element 4. For example, these valves 14 and 15 are interposed in a bleed air line 16 that is connected to a tapping point of the aircraft bleed air system which supplies compressed engine-bleed air. The shut-off valve 14 and the pressure control valve 15 are arranged in series in this order between the bleed air supply system and the displacement element 4. Namely, the portion of the bleed air line 16 downstream of the pressure control valve 15 is connected to communicate into the hollow space 7 of the displacement element 4.

In this context, the shut-off valve 14 will regulate or control the compressed bleed air flowing through the bleed air line 16, and particularly to control this supplied bleed air to a proper defined quantity of air for inflating the displacement element to the required contour shape. On the other hand, the pressure control valve 15 monitors and regulates the prevailing air pressure existing in the bleed air line 16 to avoid inflating the displacement element 4 to a pressure above a maximum allowable pressure, which could lead to a bursting rupture of the displacement element 4 even though it is made of-a strong reliable material. Such overpressure inflation could otherwise occur in the event of some sort of system failure, for example, due to improper excessive pressure in the engine bleed air system.

The pressure control valve 15 thus also serves the purpose of a pressure relief valve or over-pressure valve, which protects the displacement element 4 from excessive pressures in the engine bleed air system. This is achieved in that any excessive pressure will be vented through a pressure relief outlet PA of the pressure control valve 15, so that the pressure in the portion of the bleed air line 16 downstream from the valve 15 will be always limited to a value below the maximum acceptable pressure level.

According to a further feature of the invention, plural sensors are arranged distributed-along the length of the bleed air line 16, particularly with suitable sensor probes arranged within the cross-section of the bleed air line 16 for sensing respective air properties at sensible locations within a-defined bleed air line cross-section, for example following downstream from the pressure control valve 15. For example, such sensors predominantly include a pressure sensor to detect the actual prevailing air pressure, and further also a temperature sensor for detecting the actual prevailing air temperature of the bleed air flow through the bleed air line 16. A representative single pressure sensor 20 is shown in FIG. 1 connected to a pressure measuring device 26. Respective corresponding sensor data signal lines 25 connect the respective measuring device or devices 26 to the slat contour controller 12. In this manner, the property data detected by the sensor 20 are converted to corresponding property data feedback signals, which are provided through the measuring device 26 to the slat controller 12 and particularly into a comparator unit 19 of the slat contour controller 12, as will be described in greater detail in connection with FIG. 4 below. In general, the data provided by these sensors 20 provide condition information regarding the existing state or condition of the displacement element 4 to a state or condition determining unit as will be described below.

The electronic pressure measuring device 26 connected to the sensor data line 25 furthermore allows the sensitively detected actual air pressure to be visually monitored as well. In this context, the sensor data line 25 loops through the pressure measuring device 26 and from there continues in circuit further to the slat contour controller 12. Since an additional data line is connected between the comparator unit 19 and a flight data recorder and/or a display indicator (for example in the cockpit of the commercial transport aircraft), it is further possible to display the detected actual air pressure in the defined section of the bleed air line 16 for visually monitoring this pressure, on the display indicator in the cockpit, in addition to displaying further state or condition information relating to flight information and various other parameters provided to the slat contour controller 12 and particularly the state or condition determining unit 17 that will be described further below. This detected actual air pressure may be recorded or stored as optional data information, at least by the flight, data recorder.

FIG. 2 schematically shows the generally similar construction of a pressure control system for an inflatable displacement element 4 of which the interior hollow space 7 is divided into plural hollow chambers 8. The differences in comparison to the construction according to FIG. 1 will now be described. In the present embodiment, the compressed engine bleed air must be separately regulated and separately provided to the three chambers 8 of the displacement element 4, in order to allow a separate or individualized control of the inflation and deflation of each respective one of the three chambers 8. For this purpose, the bleed air line 16 is connected through an air line branching point 21 to three bleed air branch lines 22, 23 and 24 which are respectively individually connected to the three chambers 8 of the displacement element 4. A respective shut-off valve 14 and a respective pressure control valve 15 are interposed in each respective one of the bleed air branch lines 22, 23 and 24, and operate generally in the same manner as described above in connection with FIG. 1.

Further similarly, the electronic valve controller of the shut-off valve 14 and the electronic valve controller of the pressure control valve 15 of each respective one of the bleed air branch lines 22, 23 and 24 are connected via respective individual data signal lines 13 to the slat contour controller 12 or particularly a computer processor unit 18 of the controller 12. These valve controllers provide to the computer processor unit, 18 appropriate electronic information or signals representative of the presently existing actual valve positions of the valves or the presently existing actual pressures in the respective branch lines leading to the respective chambers 8, and in turn receive from the computer processor unit 18 electronic valve positioning commands, which cause the respective valve controllers to adjust the respective associated valves to the appropriate corresponding valve positions.

The information exchange between the respective valve controllers of the shut-off valve 14 and pressure control valve 15 serially interposed in each of the first, second and third bleed air branch lines 22, 23 and 24 (for example), takes place in the same manner as in the above described arrangement of FIG. 1. Also, the data exchange between the individual valve and the slat contour controller 12 takes place in the same manner as in the above described embodiment according to FIG. 1, but of course is adapted to accommodate plural valves in the present embodiment of FIG. 2. In this manner, the inflation of the multi-chambered displacement element 4 can be carried out with a particularly and individually adjusted chamber internal pressure and chamber inflation volume for each one of the individual chambers 8, in correlation-with the desired or required inflated outer contour of the displacement element 4.

Moreover, the multi-chambered embodiment of FIG. 2 further comprises respective pressures sensors 20 arranged in the section of each one of the bleed air branch lines 21, 23 and 24 down-stream from the respective pressure control valve 15. Each one of these sensors 20 provides respective data regarding the prevailing pressure in the respective associated branch line 22, 23 or 24 through a pressure measuring device 26 to the slat contour controller 12, in the same manner, in connection with FIG. 1. Temperature data may also be sensed, measured and processed in a similar manner, as described above. These pressure and temperature data may also be visually displayed on or through the three respective individual pressure measuring devices 26 as well as on a display unit in the cockpit, and/or these data may be further recorded or stored by a flight data recorder. Similarly, according to the description provided above regarding FIG. 1, the relevant flight condition information that has been transformed into corresponding data is prepared and provided to the slat contour controller 12 and particularly the state or condition determining unit 17, with respect to the three separate bleed air branch lines 22, 23 and 24, and correspondingly the three separate chambers 8 of the. displacement element 4.

While the illustrated embodiment has three separate chambers 8, the principles described here apply to any displacement element 4 having at least two independent chambers 8, such as two, three, four or five chambers for example. In the illustrated embodiment, the overall hollow space 7 of the displacement element 4 is divided by two intermediate separating walls to form the three separate chambers. The three separate chambers 8 are independently provided with compressed bleed air through the independent bleed air branch lines 22, 23 and 24 respectively. Thereby, the supply of compressed engine bleed air into the chambers 8 causes the displacement element 4 to be inflated, thereby expanding the rearward surface of the displacement element 4 away from the forward surface thereof that is adhesively bonded onto the concave rear surface 3 of the slat 1. On the other hand, by removing air from the chambers 8 through the respective branch lines 22, 23 and 24, or through other venting or pressure relief valves, the displacement element 4 is deflated, whereby the two sides or walls thereof are contracted toward each other, or particularly the rear surface thereof is contracted toward the front surface and thus toward the concave rear surface of the slat 1. In the present multi-chambered system, the resulting inflated contour of the displacement element 4 can be individually adjusted in relation to each of the independent chambers 8.

Generally it should further be understood, in connection with both embodiments according to FIG. 1 and FIG. 2, that whenever the respective shut-off valve 14 is opened, compressed bleed air will be provided into and through the respective associated air line, e.g. the bleed air line 16 in FIG. 1, or the individual associated bleed air branch line 22, 23 or 24 in FIG. 2. Then, the pressure control valve 15 interposed in this now-pressurized air line downstream of the respective shut-off valve 14 regulates the pressure of the provided air to a pre-defined inflation pressure of the respective chamber of the displacement element 4 connected to this respective airline, independently of the supply, air pressure provided by the aircraft bleed air system. Any excess pressure is vented or relieved through a pressure relief vent PA of the respective pressure regulating or control valve. Thereby, the respective associated chamber of the displacement element 4 is inflated to the specified inflation pressure.

The slat contour controller 12 has been illustrated and described generally above in connection with FIGS. 1 and 2. Now, further details of the slat contour controller 12, which forms the core of the pressure control system for the displacement element 4, will be described in connection with FIG. 4. The slat contour controller 12 generally includes three electronic components for data information processing, which particularly carry out the detection or acquisition, processing, preparation, and transformation of the received electronic data and then the transferral of the resultant data to respective information units connected to the controller, for example especially the valve controllers of the shut-off valves 14 and pressure control valves 15. In this context, the several electronic components may each be implemented in any suitable hardware and/or software that is adapted to carry out the necessary functions.

More particularly, the slat contour controller 12 includes a state or condition determining unit 17, a computer processor unit 18, and a comparator unit 19, whereby the state or condition determining unit 17 and the comparator unit 19 are connected to the computer processor unit 18 internally within the controller 12. The above mentioned data lines 13 are connected to the computer processor unit 18 on the one hand, and to the respective valve controllers of the shut-off valve 14 and the pressure control valve 15 respectively, as described above. The data lines may comprise signal conductors such as electrical conductors or optical fibers. The computer processor unit 18 thereby receives corresponding valve condition data regarding the present actually existing valve position of each of the valves, as well as permanent data information being transferred to the computer processor unit 18 from the state or condition determining unit 17 and from the comparator unit 19.

In this context, the state or condition determining unit 17 is connected via at least one data signal line (not shown) with a flight data acquisition unit integrated into a flight guide device within the aircraft, which provides data representing flight condition information, such as at least the angle of attack, the air speed, and the slat position. The comparator unit 19 also carries out a type of state or condition determination, but is called the comparator unit for reasons that will be discussed below in connection with the further functions of this unit 19. This comparator unit 19 permanently transfers to the computer processor unit 18, the sensitively detected and electronically converted data information relating to the actually existing air pressure and bleed-air flow through the bleed air line section downstream from the respective associated pressure control valve 15.

All of the respective provided data are acquired and prepared in the computer processor unit 18, and then processed or particularly compared with each other according to a prescribed computational algorithm. The comparison result is converted by the computer processor unit 18 into corresponding valve setting or adjusting commands respectively for the individual valves in the bleed air line 16 or the bleed air branch lines 22, 23 and 24. These valve setting commands are provided to the respective valve controllers of the individual shut-off valves 14 and/or the individual pressure control valves 15, which are then actuated accordingly, so that the respective displacement element 4 is inflated in a controlled manner with compressed bleed air to achieve the required outer contour shape of the displacement element 4.

The comparator unit 19 is particularly called a "comparator unit". because this unit may especially receive and compare not only the respective flight condition information, but also the data-processed comparison result from the computer processor unit 18, together with the above mentioned actual air pressure data that is received by the comparator unit 19 and provided to the display unit or to the flight data recorder, either entirely or partially, as described above.

Figure 3:
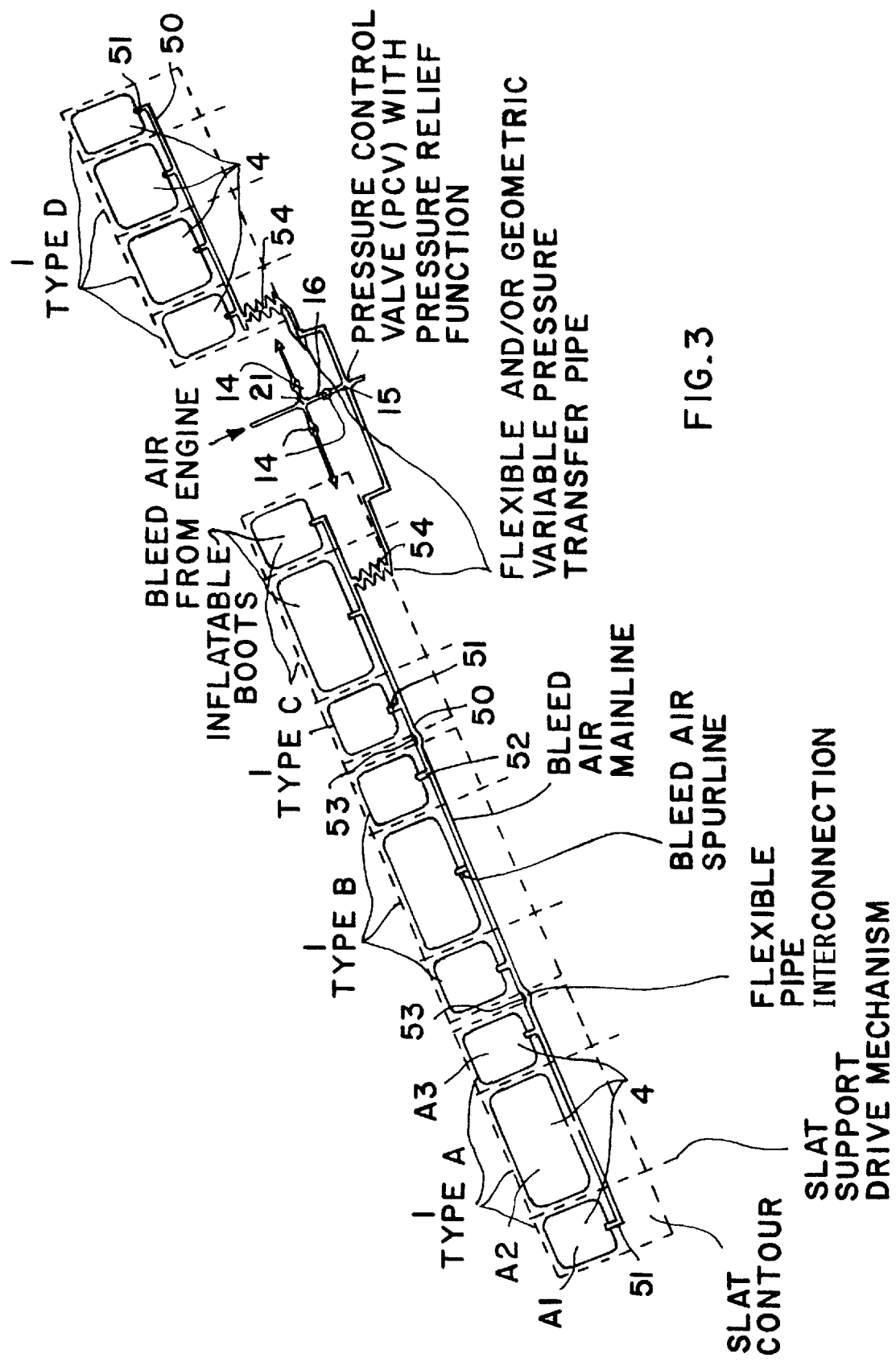
FIG. 3 is a schematic top view of a pressure control system for controlling the compressed air supply to a plurality of displacement elements of various types with varying sizes and configurations along the longitudinal extension of wing slats along the span direction of the left wing of a commercial transport aircraft.

Especially in connection with a left wing of a commercial transport aircraft, FIG. 3 schematically indicates a plurality of individual slats having respective different slat contours of types A, B, C and D respectively movably connected to the leading edge of the respective aircraft wing. Furthermore, a plurality of separate displacement elements 4 of differing types, for example, having various different hollow bellows shapes, e.g. of type A1, A2, A3, are respectively connected to the individual slats 1, and extend along the slat span direction. For simplicity, the displacement element system shown in FIG. 3 provides a single pressure chamber in the hollow space 7 within each individual displacement element 4, but includes a plurality of separate displacement elements 4 on each of the individual slats 1, whereby the separate elements 4 are grouped or arranged with due regard for clearance needed by the slat support drive mechanisms.

Due to the taper of the respective wing, the respective slats or slat segments have different configurations as, one progresses outwardly in the span direction, and correspondingly the respective inflated geometric shape of the displacement elements 4 must also differ along the span direction. While it may be aerodynamically best to provide a substantially conical or triangularly tapering displacement element, such a displacement element would be too costly and complicated. For this reason, for each respective slat, a respective selected displacement element component geometry of type A, type B, type C or type D is utilized, with a combination of respective associated displacement elements of this type, which provides the best possible compromise between minimizing the cost and complexity on the one hand versus improving ming the achieved quality of the aerodynamically influenced slat air gap geometry on the other hand.

To provide compressed engine bleed air to the respective individual displacement elements 4, a bleed air trunk line 50 is connected to a tap point of the aircraft bleed air system and extends along the wing on each side, with several air line branching points 52 connected along the respective bleed air trunk line 50, with respective bleed air spur lines 51 extending from each respective air line branching point 52. Then, for the sake of simplicity in the illustrated embodiment, the respective spur lines 51 are connected to the respective displacement elements of type A1, A2 and A3. It should be understood that multi-chamber displacement elements 4 with individually inflatable separate chambers as described above could be used instead. In this regard, note that the same description above regarding FIGS. 1 and 2 also applies here. For example, plural bleed air branch lines 22, 23 and 24 which each have a respective shut-off valve 14 and a respective pressure control valve 15 interposed therein can be branched off from the individual bleed air line 16 and lead to the bleed air trunk lines 50.

In any event, since the respective slats 1 are movable relative to each other and relative to the main wing, the bleed air lines extending between respective slats and/or between the main wing and the slats are embodied as compensation-providing flexible pipe interconnections 53, and/or as flexible and/or geometric variable pressure transfer pipes 54, in order to convey the pressurized air across the movable boundaries. In this manner, various differently dimensioned and differently shaped displacement elements 4 along the span width direction of the wing of the aircraft can be respectively provided with compressed engine bleed air as necessary. Thereby, the displacement elements 4 are respectively configured and adapted differently depending on the configuration of the respective associated slat segment, which varies along the span width direction of the wing, for example. The several displacement elements. 4 are divided segment-wise along the span width direction, whereby this segment separation can correlate with the geometric structural arrangement of the slat support drive mechanisms for the respective slat segments.

Furthermore, it is also possible to arrange individual pressure and/or temperature sensors in the bleed air trunk line or the bleed air spur lines leading to each displacement element 4 in the embodiment of FIG. 3, in addition to and in the same manner as the pressure sensors 20 provided in the individual bleed air branch lines 22, 23 and 24 in FIG. 2. These additional pressure sensors and/or temperature sensors would be connected and used to provide data to the comparator unit 19 in the same manner as the pressure sensors 20 described above. This would provide a more extensive and precise array of pressure information data to the slat contour controller 12, for more precisely and particularly controlling the inflation and deflation of the several displacement elements 4.

It should further be understood that the present system can be used for testing the airtight condition of the displacement element 4. Namely, if the respective shut-off valve,14 is opened so as to inflate the associated displacement element 4 to the specified inflation pressure, and then this shut-off valve 14 is again closed, then any air leakage from the respective displacement element 4 would be detected as a decrease-of the internal pressure of the respective displacement element 4 over time. Namely, if the respective displacement element 4 is properly completely airtight, then the internal pressure therein would remain constant. Any decrease in the pressure of the closed system indicates a leak in the respective displacement element 4 or the associated air line or the like, which is then indicated or provided as a corresponding data signal to a maintenance indicator or warning system.

The consumption of compressed-bleed air, and thereby the power consumption of the present-inventive system, is very low. Once the displacement elements 4 are in the inflated condition, no further continuous mass flow of compressed engine bleed air is necessary. Namely, once the displacement element or elements 4 are inflated to the required pressure, there is no further flow of air required into the displacement elements. The shut-off valves may be closed in this condition, thus completely shutting-off the flow of further engine bleed air. Alternatively, even if the shut-off valves remain open, the only further flow of engine bleed air will be a very small quantity of air required by the pressure control valves for properly achieving the pressure regulation. This small flow of air is released or vented by the pressure control valves in the form of a leakage or venting flow.

Although the invention has been described with reference to specific example embodiments, it will be appreciated that it is intended-to cover all modifications and equivalents within the scope of the appended claims. It should also be understood that the present disclosure includes all possible combinations of any individual features recited in any of the appended claims.

What is claimed is:

1. In an aircraft including a main wing with a leading edge, at least one slat that has a slat rear surface facing toward said leading edge and that is movably extendible from said main wing to form a slat air gap between said slat rear surface and said leading edge, at least one aerodynamic noise reducing element connected to said at least one slat, and an aircraft bleed air system including a source of compressed engine bleed air, an improvement for controlledly actuating said at least one aerodynamic noise reducing element, wherein each said noise reducing element respectively comprises an inflatable hollow displacement element with at least one hollow space therein, and wherein said improvement further comprises:
a bleed air line arrangement connected from said aircraft bleed air system to said at least one hollow space in said at least one hollow displacement element;
at least one shut-off valve interposed in said bleed air line arrangement between said aircraft bleed air system and said at least one hollow displacement element;
at least one pressure control valve interposed in said bleed air line arrangement respectively between said at least one shut-off valve and said at least one hollow displacement element;
a slat contour controller; and
respective signal conductor lines connecting said slat contour controller with said at least one shut-off valve and with said at least one pressure control valve;
wherein said slat contour controller is adapted to control said at least one shut-off valve to control a quantity of compressed engine bleed air supplied through said bleed air line arrangement into said at least one hollow displacement element, and said slat contour controller is adapted to control said at least one pressure control valve to control a pressure of the compressed engine bleed air supplied through said bleed air line arrangement into said at least one hollow displacement element.

2. The improvement in the aircraft according to claim 1, wherein said slat contour controller comprises a condition determining unit, a comparator unit, and a computer processor unit that is connected with said condition determining unit and said comparator unit internally within said slat contour controller, wherein said signal conductor lines are connected from said valves to said computer processor unit, which is adapted to receive, from said shut-off and pressure control valves, valve position data signals representing actual valve positions of said valves, and which is adapted to prepare valve control signals by processing said valve position data signals with further data provided by said condition determining unit and said comparator unit and to transmit said valve control signals to at least one of said valves via said signal conductor lines for controlling said at least one of said valves.

3. The improvement in the aircraft according to claim 2, wherein said aircraft further includes a flight guide device with a flight data acquisition unit integrated therein, which is adapted to provide flight condition data including at least angle of attack data, air speed data, and slat position data, and wherein said condition determining unit is connected to said flight data acquisition unit and is adapted to receive said flight condition data into said condition determining unit as at least a portion of said further data.

4. The improvement in the aircraft according to claim 2, further comprising at least one sensor selected from pressure sensors and temperature sensors interposed into said bleed air line arrangement, and at least one sensor signal line respectively connecting said at least one sensor to said comparator unit, wherein said comparator unit is adapted to receive pressure or temperature feedback signal data from said at least one sensor as at least a portion of said further data.

5. The improvement in the aircraft according to claim 4, wherein said at least one sensor comprises a pressure sensor which is arranged in said bleed air line arrangement between one of said at least one pressure control valve and one of said at least one hollow displacement element.

6. The improvement in the aircraft according to claim 4, wherein said at least one sensor comprises a temperature sensor which is arranged in said bleed air line arrangement between one of said at least one pressure control valve and one of said at least one hollow displacement element.

7. The improvement in the aircraft according to claim 2, wherein said at least one pressure control valve comprises an over-pressure relief valve that prevents excessive pressures above a maximum threshold pressure from arising in said at least one hollow displacement element.

8. The improvement in the aircraft according to claim 1, wherein said bleed air line arrangement comprises an air line branching point connected to said aircraft bleed air system and a plurality of bleed air branch lines connected to and extending downstream from said air line branching point, and wherein said at least one shut-off valve and said at least one pressure control valve comprise plural shut-off valves and plural pressure control valves with a respective one of said shut-off valves and a respective one of said pressure control valves arranged interposed in series respectively in each one of said bleed air branch lines.

9. The improvement in the aircraft according to claim 8, wherein said hollow displacement element has a plurality of said hollow space therein respectively defined in plural hollow chambers that are separated from each other, and wherein said bleed air branch lines are connected respectively individually and separately to said hollow chambers to independently inflate and deflate said hollow chambers through said bleed air branch lines respectively.

10. The improvement in the aircraft according to claim 1, wherein said at least one pressure control valve is adapted to control a pressure of air supplied therethrough into said hollow displacement element to a defined inflation pressure regardless of a prevailing air pressure in said aircraft bleed air system.

11. The improvement in the aircraft according to claim 1, wherein said hollow space in one said hollow displacement element is divided into plural separate hollow chambers, wherein said bleed air line arrangement comprises plural bleed air lines with respective ones of said at least one shut-off valve and respective ones of said at least one pressure control valve respectively interposed in said bleed air lines, and wherein said bleed air lines are respectively individually connected to said plural separate hollow chambers of said one hollow displacement element.

12. The improvement in the aircraft according to claim 1, wherein said aircraft includes a plurality of said slats arranged along said leading edge of said main wing, said improvement comprises at least a respective one said hollow displacement element connected respectively to each one of said slats, and said bleed air line arrangement comprises a bleed air main line and bleed air spur lines connected between said bleed air main line and said hollow displacement elements which are connected respectively to said slats.

13. The improvement in the aircraft according to claim 12, wherein said bleed air line arrangement further comprises an air line branching point connected to a respective one of said bleed air spur lines and plural bleed air branch lines connected from said air line branching point respectively to said hollow space of one or more of said hollow displacement elements, said at least one shut-off valve comprises plural shut-off valves respectively interposed in said bleed air branch lines, and said at least one pressure control valve comprises plural pressure control valves respectively interposed in series with said shut-off valves respectively in said bleed air branch lines.

14. The improvement in the aircraft according to claim 12, wherein said slats are movable relative to each other, and said bleed air main line includes at least one of flexible pipe connections and geometrically variable pressure transfer pipes bridging a respective gap between adjacent ones of said slats.

15. The improvement in the aircraft according to claim 12, wherein said aircraft further includes slat support drive mechanisms movably connecting said slats to said main wing, and wherein said hollow displacement elements respectively connected to different ones of said slats respectively have different configurations or dimensions relative to each other, and are arranged as separate segments separated respectively by said slat support drive mechanisms.

16. The improvement in the aircraft according to claim 12, further comprising at least one pressure sensor arranged in said bleed air main line or in one of said bleed air spur lines, a sensor data signal line connecting said pressure sensor to said slat contour controller, and a pressure measuring device connected to said sensor data signal line.

17. The improvement in the aircraft according to claim 1, wherein said aircraft further includes at least one of a flight data recorder and a flight data display, and wherein said improvement further comprises a signal conductor line connecting said slat contour controller to at least one of said flight data recorder and said flight data display.

18. The improvement in the&aircraft according to claim 1, further comprising a pressure sensor interposed in said bleed air line arrangement between a respective one of said at least one shut-off valve and a respective one of said at least one hollow displacement element, and a display indicator connected to said slat contour controller, wherein said slat contour controller is adapted to monitor an airtight condition of said at least one hollow displacement element and to display a leakage indication on said display indicator in the event of detecting a leak in said at least one hollow displacement element.

19. The improvement in the aircraft according to claim 18, wherein said slat contour controller is adapted to monitor said airtight condition of said at least one hollow displacement element by controlling said at least one shut-off valve and said at least one pressure control valve to inflate said at least one hollow displacement element to a specified inflation pressure, then closing said at least one shut-off valve, then monitoring a monitored pressure in said at least one hollow displacement element with said pressure sensor, and then displaying said leakage indication if said monitored pressure decreases over time to below said specified inflation pressure.

* * * * *

UNITED STATES PATENT AND TRADEMARK OFFICE
CERTIFICATE OF CORRECTION

PATENT NO. : 6,536,714 B2
DATED : March 25, 2003
INVENTOR(S) : Gleine et al.

It is certified that error appears in the above-identified patent and that said Letters Patent is hereby corrected as shown below:

Title page,
Item [75], Inventors, replace "Kakensdorf" by -- Kakenstorf --;

Column 1,
Line 42, after "aircraft", delete "At";
Line 59, after "present", delete "5";

Column 2,
Line 8, after "extended", replace "configu ration" by -- configuration --;

Column 3,
Line 17, after "accommodate the", delete "at";

Column 4,
Line 36, after "lines to", delete "a";

Column 5,
Line 65, after "control", delete "20";

Column 6,
Line 7, after "element 4.", insert a new paragraph break;
Line 38, after "compressed", replace "engine-bleed" by -- engine bleed --;
Line 55, after "made", replace "of-a" by -- of a --;

Column 7,
Line 2, after "arranged", replace "distributed-along" by -- distributed along --;
Line 6, replace "a-defined" by -- a defined --;

Column 8,
Line 28, after "in", replace "correlation-with" by -- correlation with --;
Line 33, after "24", replace "down-stream" by -- downstream --;

Column 10,
Line 8, replace "bleed-air" by -- bleed air --;
Line 26, after "unit"", delete ".";
Line 52, after "as", delete ",";
Line 65, after "improving", delete "ming";

UNITED STATES PATENT AND TRADEMARK OFFICE
CERTIFICATE OF CORRECTION

PATENT NO. : 6,536,714 B2
DATED : March 25, 2003
INVENTOR(S) : Gleine et al.

It is certified that error appears in the above-identified patent and that said Letters Patent is hereby corrected as shown below:

Column 11,
Line 10, after "elements", insert -- 4 --;
Line 56, after "valve", delete ",";
Line 61, replace "decrease-of" by -- decrease of --;

Column 12,
Line 3, after "of", replace "compressed-bleed" by -- compressed bleed --;
Line 4, after "of the", replace "present-inventive" by -- present inventive --;
Line 21, after "it is", replace "intended-to" by -- intended to --;

Column 15,
Line 1, after "in the", delete "&".

Signed and Sealed this

Twenty-ninth Day of July, 2003

JAMES E. ROGAN
*Director of the United States Patent and Trademark Office*